United States Patent
Park

[19]

[11] Patent Number: 6,125,237
[45] Date of Patent: Sep. 26, 2000

[54] DEVICE AND METHOD FOR OPENING AND CLOSING A BARRIER IN A ZOOM CAMERA

[75] Inventor: Sam-Ki Park, Changwon-si, Rep. of Korea

[73] Assignee: Samsung Aerospace Industries, Ltd., Changwon-si, Rep. of Korea

[21] Appl. No.: 09/311,345

[22] Filed: May 13, 1999

[30] Foreign Application Priority Data

May 14, 1998 [KR] Rep. of Korea ...................... 98-17325

[51] Int. Cl.[7] .............................. G03B 13/34; G03B 17/00
[52] U.S. Cl. ............................. 396/79; 396/132; 396/448
[58] Field of Search .............................. 396/448, 79, 132, 396/89

[56] References Cited

U.S. PATENT DOCUMENTS

| | | | |
|---|---|---|---|
| 4,876,563 | 10/1989 | Ishida et al. | 396/448 |
| 5,892,998 | 4/1999 | Kodaira et al. | 396/448 |
| 5,993,078 | 11/1999 | Nomura et al. | 396/448 |
| 6,036,377 | 3/2000 | Nomura et al. | 396/448 |

*Primary Examiner*—W. B. Perkey
*Attorney, Agent, or Firm*—Finnegan, Henderson, Farabow, Garrett & Dunner, L.L.P.

[57] ABSTRACT

Disclosed is a device and method for opening and closing a barrier in a zoom camera. The device includes a connection lever fixed to a lens barrel of a focus lens group and rotated by the transmission of a rotational power of a focusing motor; and a barrier driving unit including a barrier driving lever contacting the connection lever to receive rotational force of the connection lever and a ring portion for pushing sector pins of barrier sectors in a direction to close the barrier sectors. The method includes the steps of determining if a power switch has been turned ON in an initialized state; opening barrier sectors by operating a barrier driving unit according to operating signals of a control unit if it is determined that the power switch has been turned ON; protecting a lens of the zoom camera by closing the barrier sectors or retracting a movable lens barrel in a state where the barrier sectors are open if it is determined that a first release switch has not been turned ON during a first or second predetermined interval of time, respectively; and performing photographing according to operating signals of the first release switch and a second release switch.

6 Claims, 11 Drawing Sheets

DEVICE AND METHOD FOR OPENING AND CLOSING A BARRIER IN A ZOOM CAMERA

CROSS-REFERENCES TO RELATED APPLICATIONS

This application is based on application Ser. No. 97-1735 filed in the Korean Industrial Property Office on May 14, 1998, the content of which is incorporated herein by reference.

BACKGROUND OF THE INVENTION

1. Field of the Invention

The present invention relates to a device and method for opening and closing a barrier in a zoom camera. More particularly, the present invention relates to a device and method for opening and closing a barrier in a zoom camera in which opening and closing of the barrier is performed by a focus control motor mounted in a shutter block such that problems arising in the use of a zoom motor are avoided.

2. Description of the Related Art

Generally, zoom cameras are equipped with a focus system in which the focal length is changed by multiple steps. Zoom cameras typically also include a zoom system. These two systems operate separately in most zoom cameras. That is, the zoom system begins to operate when a power switch is turned on and the focus system begins to operate when a shutter is operated.

A zoom camera comprising the above zoom system and focus system has a barrier installed in a front panel to protect the lens. The barrier is linked with the zoom system to be opened or shut respectively as a power switch is turned on and off.

FIG. 12 shows a partial cross-sectional view of a lens system in the conventional zoom camera. With regard to a structure in the conventional lens system used to open and close the barrier, formed on a circumference of a movable lens barrel 201 and assembled to a fixed lens barrel 203 are gears connected through a gear train 207 to a zoom motor 205 and to a helicoid pattern meshed to a helicoid pattern formed on an inner circumference of the fixed lens barrel 203. The fixed lens barrel 203 is fixed to a body of a camera (not shown). The rotational force of zoom motor 205 is transmitted through the gear train 207 to the movable lens barrel 201.

With the above structure, the opening and closing of barrier sectors 213 are achieved by (a) transmitting the rotational force of the zoom motor 205 to the movable lens barrel 201; (b) rotational and rectilinear movement of the movable lens barrel 201 with respect to the fixed lens barrel 203, whereby the revolving power is conveyed; and (c) using the rotational force of the movable lens barrel 201 to open and close the barrier sector 213.

That is, the structure used to open and close the barrier in the conventional zoom camera is such that a barrier driving lever 209 is disposed to receive the rotational force of the movable lens barrel 201, and by the connection of a ring portion 211 of the barrier driving lever 209 to the barrier sectors 213, the barrier sectors 213 are opened or closed according to the rotation of the ring portion 211. The barrier sectors 213, which are designed to open or close according to the rotation of the ring portion 211, are hinged with the ring portion 211 through a driving pin 229 and are disposed in a front panel such that they (the barrier sectors 213) can freely rotate.

Focusing is carried out by the forward and backward movement of a focus lens group 217 inside the above movable lens barrel 201. The focus lens group 217 is disposed in a shutter block 219, and a focusing motor 221 is provided in the vicinity of the focus lens group 217 and within the shutter block 219. To focus, a gear train 237 is connected to the focusing motor 221 and a focusing ring 223 is rotatably meshed with the gear train 227. Further, a connection lever 225 is connected to the focusing ring 223, and is fixedly connected to the focus lens group 217.

When the power switch of a zoom camera having the above structure is turned on, the zoom motor 205 begins to operate, and the driving power of the zoom motor 205 is transmitted through the gear train 207 such that the movable lens barrel 201 is moved to a wide position. During this process, the barrier driving lever 209 is rotated, thereby rotating the pair of the barrier sectors 213 to open the same.

When the shutter switch is operated in a state where the barrier sectors 213 are open, the focusing motor 221 starts running, and the rotational power of the focusing motor 221 conveyed through the gear train 227 rotates the focusing ring 223. The focusing ring 223, by moving the connection lever 225 connected to the focus lens group 217, moves the focus lens group 217 to a predetermined position and then returns to its initial position. When the power switch of the zoom camera is turned off, the movable lens barrel 201 returns to its initial position, and the movable lens barrel 201 is disconnected from the barrier driving lever 9 to close the barrier sectors 213.

In the above structure used to open and close the barrier of the conventional zoom camera, since a plurality of structural elements are integrated with the movable lens barrel 201, great stress is put upon the zoom motor 205. That is, in the case where the barrier sectors 213 are opened or closed simultaneously while zooming is performed, driving all of the necessary elements places a significant strain on the zoom motor 205.

Further, it is possible that the opening and closing of the barrier sectors 213 will not be smooth as a result of assembly errors and/or incorrect adjustments related to focusing made in the movable lens barrel 201.

In addition, the lens may become damaged by foreign substances or an external impact because the barrier sectors 213 are left opened during the entire zooming operation. Therefore, if the barrier sectors 213 are closed by operation of the power switch to prevent damage to the lens, the process of turning the power switch back on, opening the barrier sector 213, and finally performing zooming is inconvenient.

Finally, since the power switch is turned off to close the barrier sectors 213, the taking of photos or other such quick shots is not possible even with the operation of a release switch, and the user must go through the cumbersome step of first turning the power switch on to open the barrier sectors 213 even before focusing and zooming can be performed.

SUMMARY OF THE INVENTION

The present invention has been made in an effort to solve the above problems.

It is an object of the present invention to provide a device and method for opening and closing a barrier in a zoom camera in which a load given to a zoom motor is reduced while enabling barrier sectors to be normally opened and closed.

To achieve the above object, the present invention provides a device and method for opening and closing a barrier in a zoom camera. The device includes a connection lever fixed to a lens barrel of a focus lens group and rotated by transmission of a rotational power of a focusing motor; and a barrier driving unit including a barrier driving lever contacting the connection lever to receive rotational force from the connection lever and a ring portion for pushing sector pins of barrier sectors in a direction to close the barrier sectors.

According to a feature of the present invention, the device further includes a spring for exerting an elastic force on the barrier driving unit in a direction to open the barrier sectors; and a close spring for exerting an elastic force on the barrier driving unit in a direction to close the barrier sectors.

According to another feature of the present invention, the elastic force of the open spring is greater than the elastic force of the close spring, and the elastic force of the close spring is sufficient to move the barrier sectors.

According to yet another feature of the present invention, the rotational power of the focusing motor is greater than the elastic force of the open spring and rotates the connection lever such that the connection lever rotates the barrier driving lever of the barrier driving unit in a direction to close the barrier sectors.

According to yet another feature of the present invention, the device further includes a barrier sensor installed in a shutter block to detect a position of the barrier sectors. The barrier sensor transmits signals corresponding to the position of the barrier sectors to a control unit such that the control unit can control an operation of the focusing motor.

According to yet another feature of the present invention, the device further includes a barrier switch electrically connected to a control unit, which controls an operation of the focusing motor. The barrier switch transmits signals to the control unit to open or close the barrier sectors.

The present invention also includes a method comprising the steps of determining if a power switch has been turned ON in an initialized state; opening barrier sectors by operating a barrier driving unit according to operating signals of a control unit if it is determined that the power switch has been turned ON; protecting a lens of the zoom camera by closing the barrier sectors or retracting a movable lens barrel in a state where the barrier sectors are open if it is determined that a first release switch has not been turned ON during a first or second predetermined interval of time, respectively; and performing photographing according to operating signals of the first release switch and a second release switch.

According to a feature of the present invention, the step of opening the barrier sectors further comprises the step of determining if the barrier sectors are fully open using a signal of a barrier sensor.

According to another feature of the present invention, if the signal of the barrier sensor is low, the step of opening the barrier sectors is repeated, and if the signal of the barrier sensor is high, the step of protecting the lens of the zoom camera is performed.

According to yet another feature of the present invention, the step of protecting the lens of the zoom camera further includes the steps of operating a timer if it is determined that the barrier sectors are fully open; detecting an ON signal of the first release switch; determining if the first predetermined time period has elapsed if no ON signal of the first release switch is detected and returning to the step of detecting an ON signal of the first release switch if the first predetermined time period has not elapsed; closing the barrier sectors by operating the barrier driving unit if the ON signal of the first release switch is not detected during the first predetermined time period; determining if the second predetermined time period has elapsed after the barrier sectors are closed if the ON signal of the first release switch is not detected and returning to the step of detecting an ON signal of the first release switch if the second predetermined time period has not elapsed; and retracting the movable lens barrel and initializing all values if it is determined that the second predetermined time period has elapsed, and returning to the step of detecting the ON signal of the first release switch after the movable lens barrel has been retracted.

According to yet another feature of the present invention, the step of performing photographing further includes the steps of determining if the barrier sectors are open according to the signals of the barrier sensor if the ON signal of the first release switch is detected; opening the barrier sectors by driving the barrier driving unit if it is determined that the barrier sectors are closed; performing a first release operation of measuring the distance to the object and light if it is determined that the barrier sectors are open; detecting an ON signal of the second release switch; and performing a second release operation of exposure and winding film if it is determined that the second release switch has been turned ON by detecting the ON signal of the second release switch.

According to yet another feature of the present invention, if it is determined that the second release switch has been turned ON, the step of performing the second release operation is performed, and if the ON signal of the second release switch is not detected, the timer is initialized, after which the step of operating the timer is performed.

In another aspect, the method includes the steps of determining, in a state where all values have been initialized, if a power switch has been turned ON by detecting an ON signal of the power switch; determining if a first release switch has been turned ON by detecting an ON signal of the first release switch; opening barrier sectors by operating a barrier driving unit if it is determined that the first release switch is ON, the barrier driving unit being operated by control signals of a control unit; determining if the barrier sectors are fully open using a signal of a barrier sensor, and performing the step of opening the barrier sectors if it is determined that the barrier sectors are not fully open; performing a first release operation of measuring the distance to the object and light if it is determined that the barrier sectors are fully open; determining if a second release switch is ON by detecting an ON signal of the second release switch; performing a second release operation of exposure and winding film if it is determined that the second release switch has been turned ON; closing the barrier sectors by operating the barrier driving unit using the control signals of the control unit; and re-determining if the first release switch has been turned ON by detecting the ON signal of the first release switch if it is determined that the second release switch has not been turned ON.

According to a feature of the present invention, the above step of redetermining if the first release switch has been turned ON, if it is determined that the first release switch has been turned ON, the step of performing the first release operation is performed, and if it determined that the first release switch has not been turned ON, the step of closing the barrier sectors is performed.

In yet another aspect, the method includes the steps of determining, in a state where all values have been initialized, if a power switch has been turned ON by detecting an ON signal of the power switch; determining if a barrier switch has been turned ON by detecting an ON signal of the barrier switch if it is determined that the power switch is ON; opening barrier sectors by operating a barrier driving unit using control signals of a control unit if it is determined that the barrier switch is ON; determining if the barrier sectors are fully open using a signal of a barrier sensor, and performing the step of opening the barrier sectors if it is determined that the barrier sectors are not fully open; determining if the barrier switch has been turned OFF by detecting an OFF signal of the barrier switch if it is determined that the barrier sectors are fully open; closing the barrier sectors by operating the barrier driving unit using the control signals of the control unit if it is determined that the barrier switch has been turned OFF, and again performing the step of determining if the barrier switch has been turned ON; determining if a first release switch has been turned ON if it is determined that the barrier switch has not been turned OFF; repeating the step of determining if the barrier switch has been turned OFF if it is determined that the first release switch has not been turned ON, and performing a first release operation of measuring the distance to the object and light if it is determined that the first release switch has been turned ON; determining if a second release switch is ON by detecting an ON signal of the second release switch; performing a second release operation of exposure and winding film if it is determined that the second release switch has been turned ON; and performing the step of determining if the first release switch has been turned ON if it is determined that the second release switch has not been turned ON.

BRIEF DESCRIPTION OF THE DRAWINGS

The accompanying drawings, which are incorporated in and constitute a part of the specification, illustrate an embodiment of the invention, and, together with the detailed description of the preferred embodiments, serve to explain the principles of the invention.

DETAILED DESCRIPTION OF THE PREFERRED EMBODIMENTS

Preferred embodiments of the present invention will now be described in detail with reference to the accompanying drawings.

Figure 1:
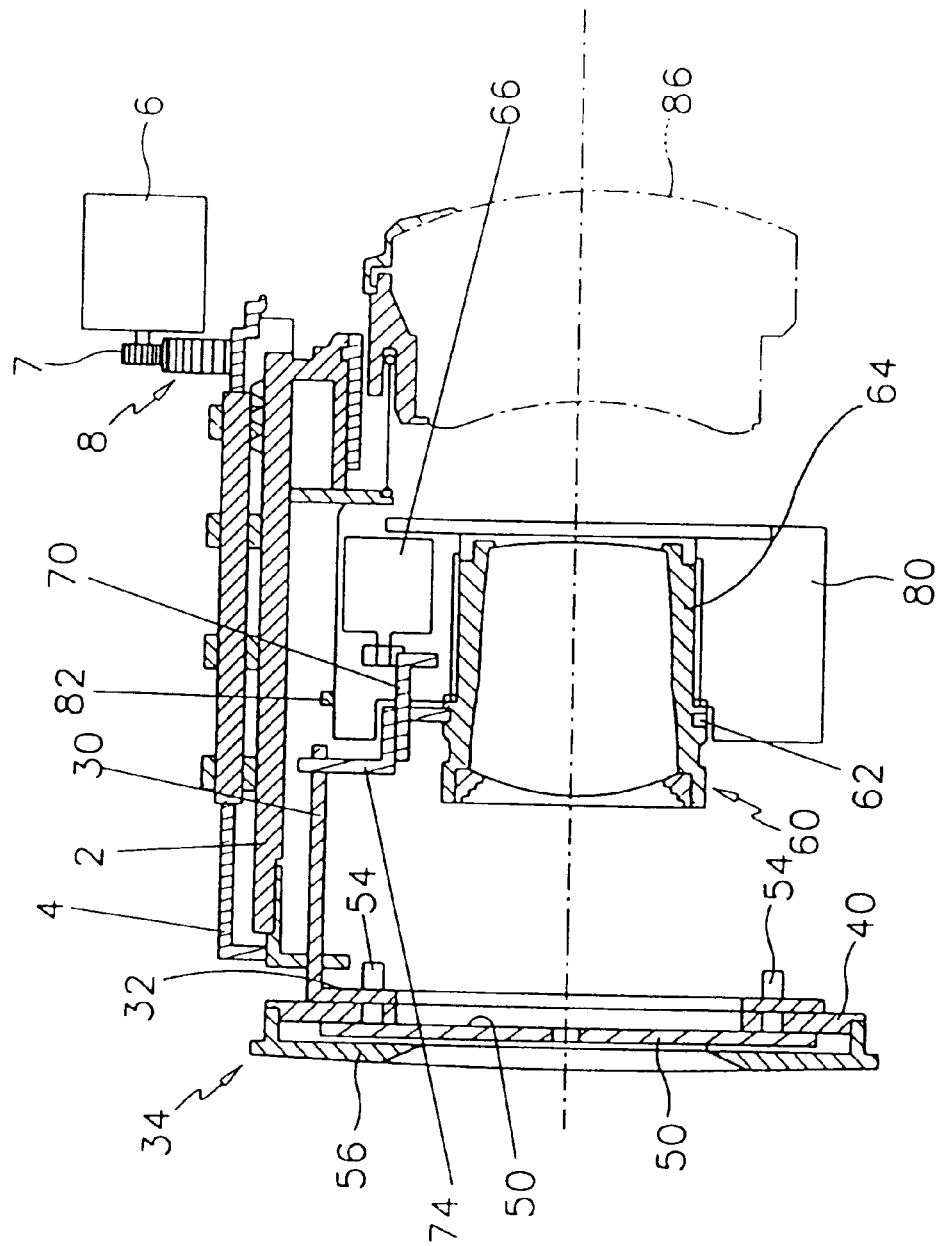
FIG. 1 is a partial cross-sectional view of a lens system for a zoom camera including a barrier opening and closing device according to a preferred embodiment of the present invention.

FIG. 1 shows a partial cross-sectional view of a lens system for a zoom camera including a barrier opening and closing device according to a preferred embodiment of the present invention. Reference numeral 2 in the drawing indicates a movable lens barrel.

The movable lens barrel 2 is connected to a fixed lens barrel 4 by meshing of helicoid patterns (not shown) formed on an outer circumference of the movable lens barrel 2 and an inner circumference of the fixed lens barrel 4. Gears (not shown) formed on predetermined portions of the outer circumference of the movable lens barrel 2 are connected to a gear 7 of a zoom motor 6 through a gear train 8, resulting in the gears of the movable lens barrel 2 being driven by the zoom motor 6. Although such a structure for opening and closing the barrier of a zoom camera is similar to that of the prior art, in the present invention, the barriers are not open through a zoom operation but is integrated with a focusing operation.

Figure 2:
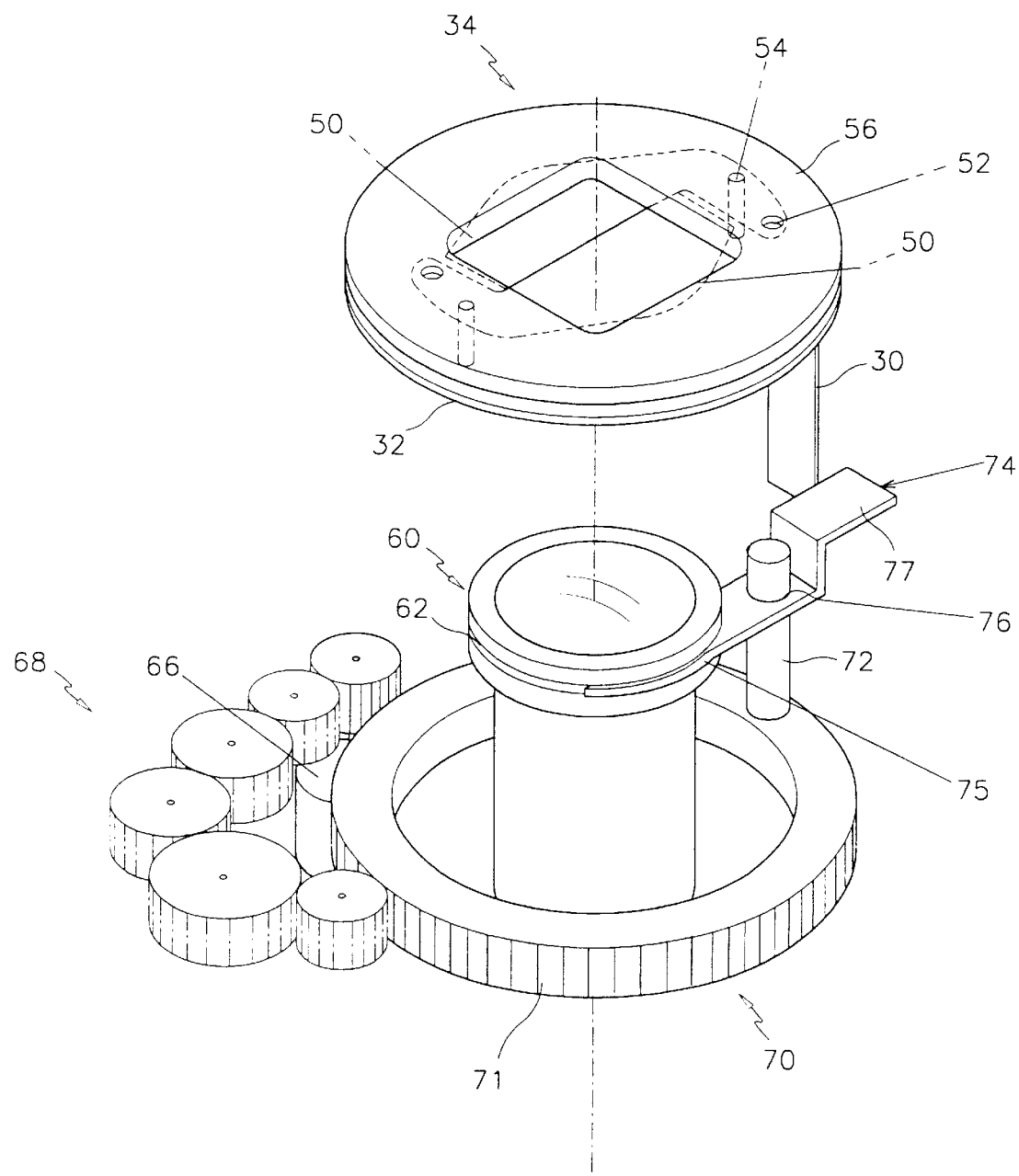
FIG. 2 is a perspective view of the barrier opening and closing device shown in FIG. 1 used to illustrate a power transmission process of the device.

FIG. 2 shows a perspective view of the barrier opening and closing device shown in FIG. 1 used to illustrate a power transmission process of the device. The barrier opening and closing device according to a preferred embodiment of the present invention is driven by the operation of a focus lens group 60. In more detail, a barrier driving lever 30 is directly connected to a connection lever 74, and the connection lever 74 is connected to the focus lens group 60 such that the opening and closing of barrier sectors 50 are performed simultaneously with the focusing control operation.

Figure 3:
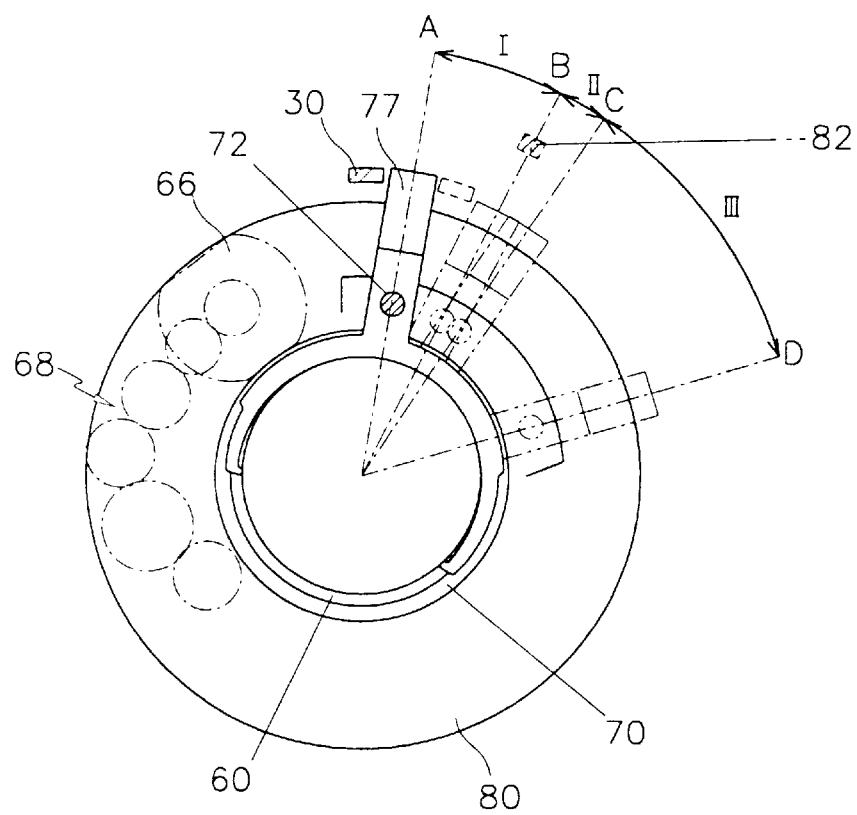
FIG. 3 is a cross-sectional view of the barrier opening and closing device shown in FIG. 1 used to illustrate an operation of a connection lever.

With reference also to FIG. 3, rotational power of a focusing motor 66, which is mounted in a shutter block 80, is transmitted to a focusing ring 70 through a gear train 68. For this purpose, gear teeth 71 are formed on an outer circumference of the focusing ring 70, the gear teeth 71 being meshed with at least one gear of the gear train 68. Further, a fixing groove 62 is formed on an outer circumference of a housing 64 of the focus lens group 60, and a portion of the connection lever 74 is fixedly inserted in the fixing groove 62. Also, a driving pin 72, which is inserted in a connection hole 76 of the connection lever 74, is mounted on the focusing ring 70. Accordingly, the focus lens group 60 rotates together with the rotation of the focusing ring 70.

The connection lever 74 includes an arc portion 75 which is inserted in the fixing groove 62 of the focus lens group 60 and a lever portion 77 extended from the arc portion 75 and having the connection hole 76 into which the driving pin 72 is inserted. The arc portion 75 of the connection lever 74 is fixed to the fixing groove 62 of the focus lens group 60 using a conventional method such as either insertion in the fixing groove 62 in the same manner as a snap ring or by gluing the arc portion 75 in the fixing groove 62 such that the connection lever 74 rotates together with the focus lens group 60.

Figure 4:
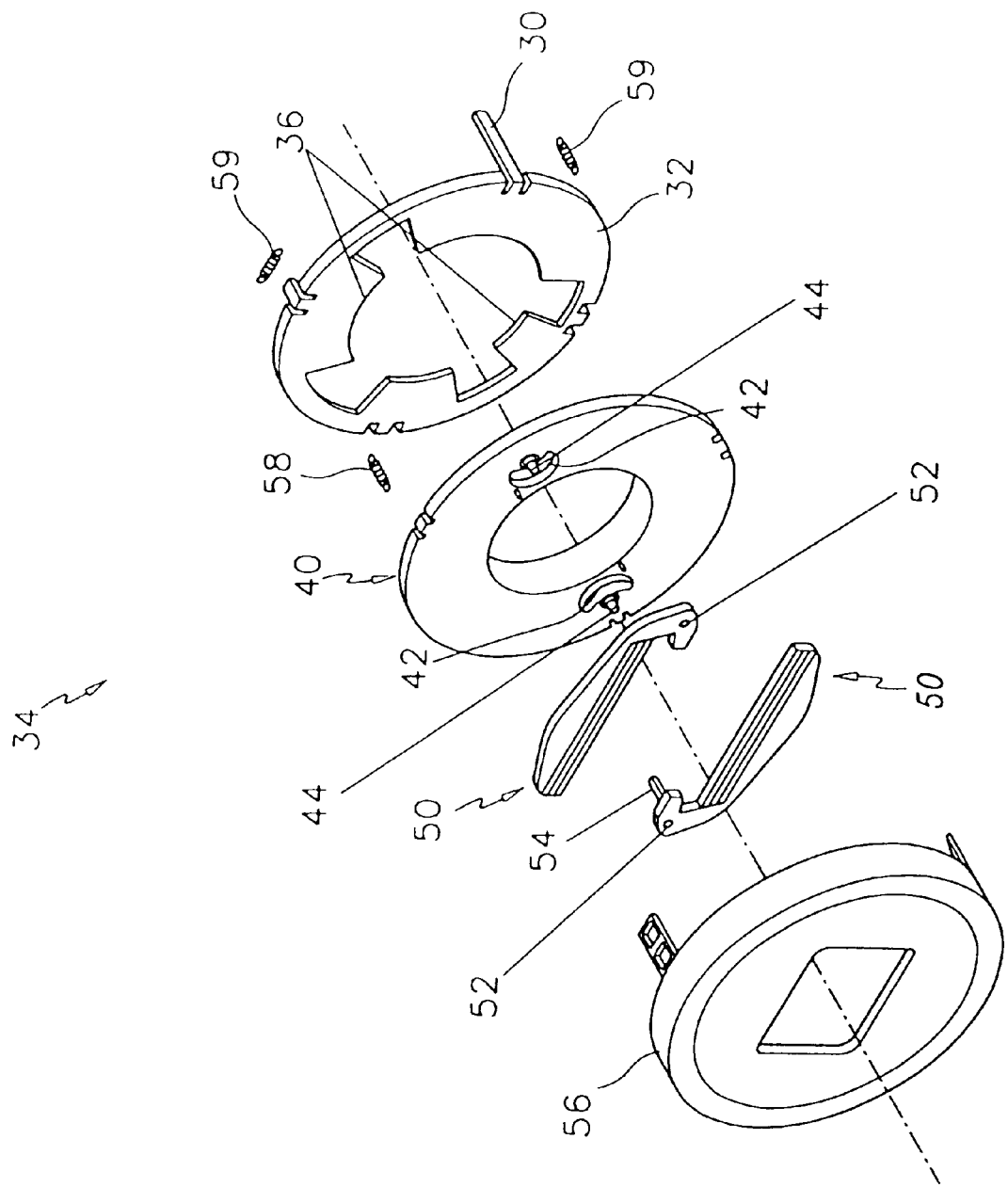
FIG. 4 is an exploded perspective view of the barrier opening and closing device shown in FIG. 1.

Referring to FIGS. 2 and 4, a barrier driving unit 34 comprises the barrier driving lever 30 contacting the lever portion 77 of the connection lever 74 to receive the rotational force of the focus lens group 60, and a ring portion 32 to which the barrier driving lever 30 is integrally formed. Further, a barrier base 40 is interposed between the ring portion 32 and the pair of the barrier sectors 50.

Arc-shaped slots 42 are formed at predetermined positions in the barrier base 40, and sector pins 54, formed protruding from each of the barrier sectors 50, are movably inserted in the slots 42. Also, rotation holes 52 are formed in each of the barrier sectors 50 at a predetermined distance from the sector pins 54, and rotation pins 44 are formed in the barrier base 40 in proximity to the slots 42. The sector pins 54 are rotatably inserted in the rotation holes 52. With this structure, the barrier sectors 50 are able to open and close by undergoing rotation centered around the rotation pins 44. The arc shape of the slots 42 corresponds to the circular movement of the barrier sectors 50. The above sector pins 54 have a length such that they pass through the slots 42 of the barrier base 40 to make contact with the ring portion 32. As a result, the rotational force of the ring portion 32 is transmitted to the sectors 50. The ring portion 32 includes prominent portions 36 which push the sector pins 54 when the ring portion 32 is rotating.

In addition, an open spring 58 is provided between the barrier base 40 and the ring portion 32. The open spring 58 rotates the ring portion 32 when the connection lever 74, connected via the driving pin 72 to the focusing ring 70, moves to open the barrier sectors 50 (i.e., to an open position). The open spring 58 is mounted such that it provides constant tension to the ring portion 32 in a direction for opening the barrier sectors 50. Further, a close spring 59 for closing the barrier sectors 50 is provided between each of the sector pins 54 and the ring portion 32. The close springs 59 are mounted such that they provide constant tension to the ring portion 32 in a direction for opening the barrier sectors 50. An elastic force of the open spring 58 is greater than a combined elastic force of the close springs 59, the elastic force of each of the close springs 59 being such that it can move the weight of the respective barrier sector 50. Moreover, a rotational force of the connection lever 74 (i.e., a rotational force of the focus control motor 66) is greater than the elastic force of the open spring 58. Here a step motor or a DC motor can be used for the focusing motor 66.

A detailed description of the ring portion 32 and barrier driving lever 30, the barrier sectors 50, the open spring 58, the close springs 59, and the barrier base 40 will not be given herein since it is also possible to use conventional structures for these elements. In the above preferred embodiment of the present invention, it is possible to use the structure described above or conventional structures.

In the barrier opening and closing device according to the preferred embodiment of the present invention, a barrier sensor 82, as shown in FIGS. 1 and 3, for sensing the position of the barrier sectors 50 is mounted in the shutter block 80. The barrier sensor 82 is realized through a photo interrupter, and is mounted such that it can detect the open state of one of the barrier sectors 50. Since the barrier sectors 50 open and close simultaneously, it is sufficient for the barrier sensor 82 to detect the open state of only one of the barrier sectors 50.

Reference numeral 56 in the drawings indicates a front panel. The barrier sectors 50 and the barrier base 40 are provided in the front panel 56. Also, reference numeral 86 in FIG. 1 indicates a rear lens group.

Figure 7:
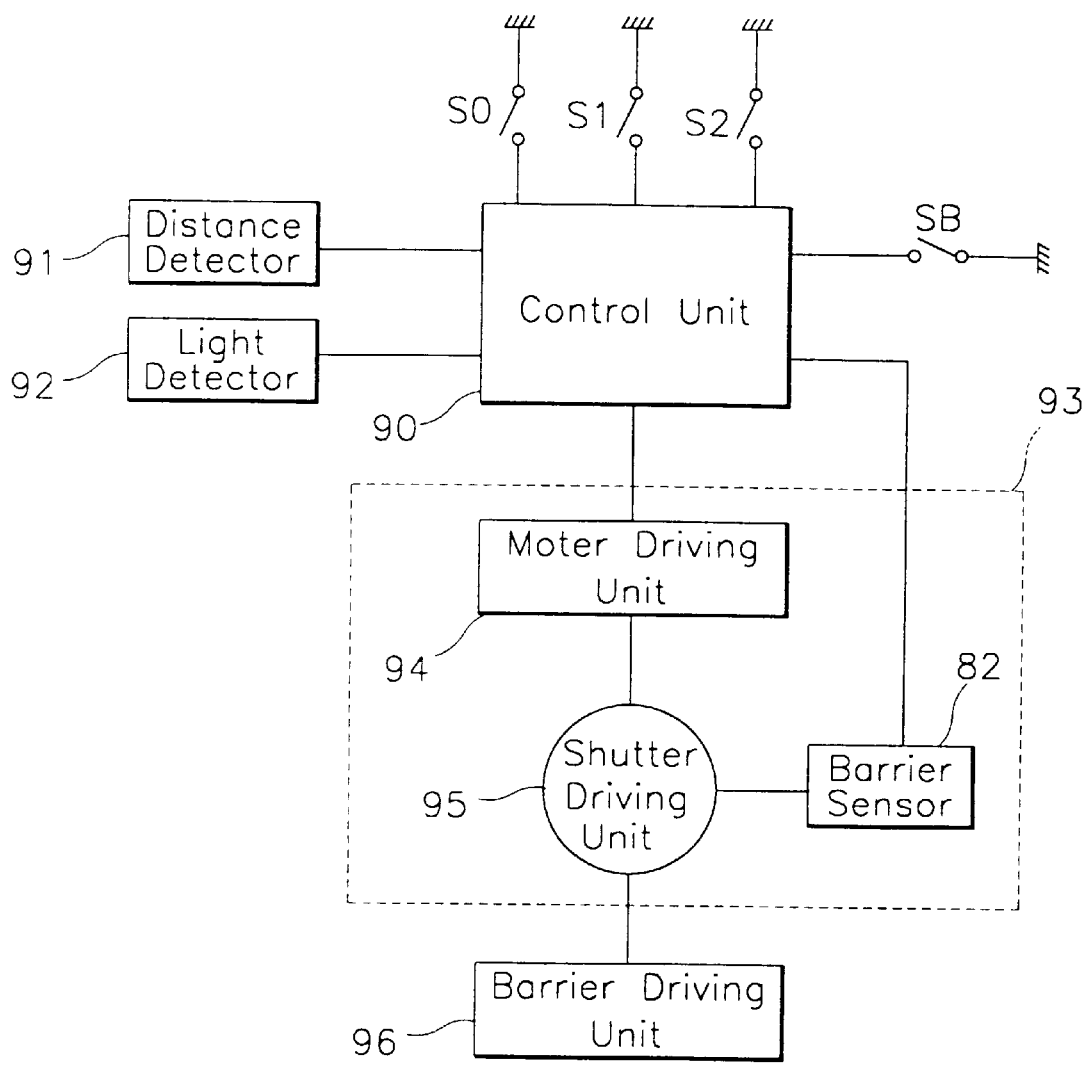
FIG. 7 is a block drawing of a camera control system according to the present invention.

FIG. 7 shows a block drawing of a camera control system according to the present invention. The camera control system comprises a control unit 90, a shutter driving unit 93, and a barrier driving unit 96. The control unit 90 and the barrier driving unit 96 are connected to the shutter driving unit 93. A power switch SO, a first release switch S1, and a second release switch S2 are electrically connected to the control unit 90. Also, a distance detector 91 for performing automatic focusing and a light detector 92 for performing automatic exposure are connected to the control unit 90. In addition, a barrier switch SB is connected to the control unit 90 such that, in a state where the power switch SO is ON, it is possible for the control unit 90 to selectively open and close the barrier sectors 50 by operating the barrier switch SB to ON and OFF states.

The shutter driving unit 93 includes a motor driving unit 94 for operating the focusing motor 66 and the zoom motor 6, a shutter driver 95 connected to the motor driving unit 94 and which operates to open and close shutters, and the barrier sensor 82 electrically connected to the control unit 90 and which detects the opening state of the barrier sectors 50. The shutter driving unit 95 is connected to the barrier driving unit 96.

The barrier driving unit 96 includes the barrier driving unit 34 receiving rotational force of the focusing motor 66 by contact of the barrier driving lever 30 with the connection lever 74, the open spring 58 exerting constant force to the ring portion 32 of the barrier driving unit 34 in a direction to open the barrier sectors 50, and the close springs 59 exerting constant force to the ring portion 32 of the barrier driving unit 34 in a direction to close the barrier sectors 50.

The operation of the barrier opening and closing device according to the preferred embodiment of the present invention and structured as in the above will be described hereinafter.

When the power switch SO (installed in the body of the camera) is turned ON by the user, power is applied by the motor driving unit 94 of the shutter driving unit 93, the shutter driving unit 93 receiving a control signal for this operation from the control unit 90. Accordingly, the focus control motor 66 and the zoom motor 6 begin to operate. By the operation of the focus control motor 66, the focusing ring 70 begins to rotate by receiving the rotational force of the focus control motor 66 through the gear train 68. At this time, through the connection of the driving pin 72 to the focusing ring 70 and the connection lever 74 to the driving pin 72, and the insertion of the arc portion 75 of the connection lever 74 in the fixing groove 62 of the focus lens group 60, the rotation of the focusing ring 70 results also in the rotation of the focus lens group 60. That is, the focus lens group 60 is moved to an initial position C as shown in FIG. 3. Here, the positioning of the focus lens group 60 is based on the connection lever 74 which is mounted at a predetermined location in the fixing groove 62 of the focus lens group 60.

In the above, the connection lever 74 also acts to operate the barrier driving unit 34 by the rotation of the focusing ring 70. That is, the lever portion 77 of the connection lever 74 pushes the barrier driver lever 30 of the ring portion 32 such that the ring portion 32 is rotated counterclockwise (in FIG. 3). Accordingly, only the elastic forces of the open spring 58 and the close springs 59 come to operation on the ring portion 32, and since the elastic force of the open spring 58 is greater than the combined elastic force of the close springs 59, the ring portion 32 rotates by the open spring 58. This results in the prominent portions 36 of the ring portion 32 moving the sector pins 54 such that the sector barriers 50 pivot from a closed position to an open position as shown respectively in FIGS. 5 and 6.

Simultaneously with the above, by the operation of the zoom motor 6, zooming is performed using the conventional method while the movable lens barrel 2 moves to the wide position.

When focus control is executed with the power switch (SO) ON, the focus control motor 66 operates, with reference to FIG. 3, such that the focus lens group 60 operates within a focus control section III between the initial position C and a maximum position D. Accordingly, when focus control is performed, the barrier driving lever 30 comes to be positioned in a barrier switching section I between a barrier close position A and a barrier open position B. The barrier sensor 82 is provided at the barrier open position B to enable detection of the open state of the barrier sectors 50. Further, an allowance section 11 is provided between the barrier open position B and the initial position of focus control C at which focus control is carried out while the barrier sectors 50 are maintained in a fully open state.

If the power switch SO is turned OFF in the above state, power is applied by the motor driving unit 94 of the shutter driving unit 93, the shutter driving unit 93 receiving a control signal for this operation from the control unit 90. As a result, the focus control motor 66 and the zoom motor 6 begin to operate. By the operation of the focus control motor 66, the focusing ring 70, and therefore also the connection lever 74, rotate. Accordingly, the lever portion 77 of the connection lever 74 rotates counterclockwise (in FIG. 3) to push the barrier driving lever 30 of the barrier driving unit 34.

Figure 5:
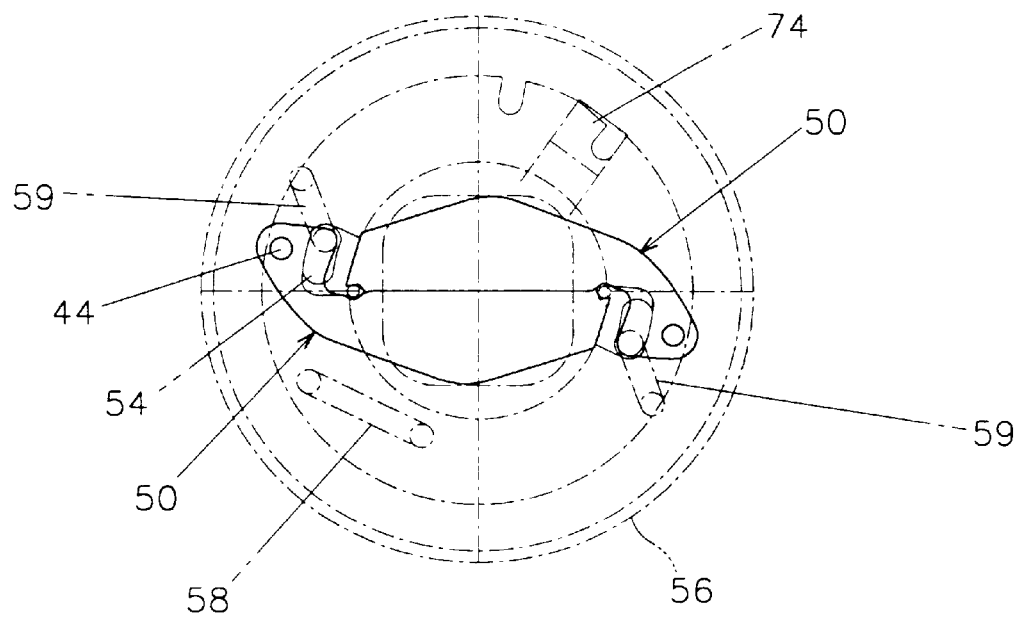
FIG. 5 is a plane view of the barrier opening and closing device shown in FIG. 1 in a state where barrier sectors are closed.
Figure 6:
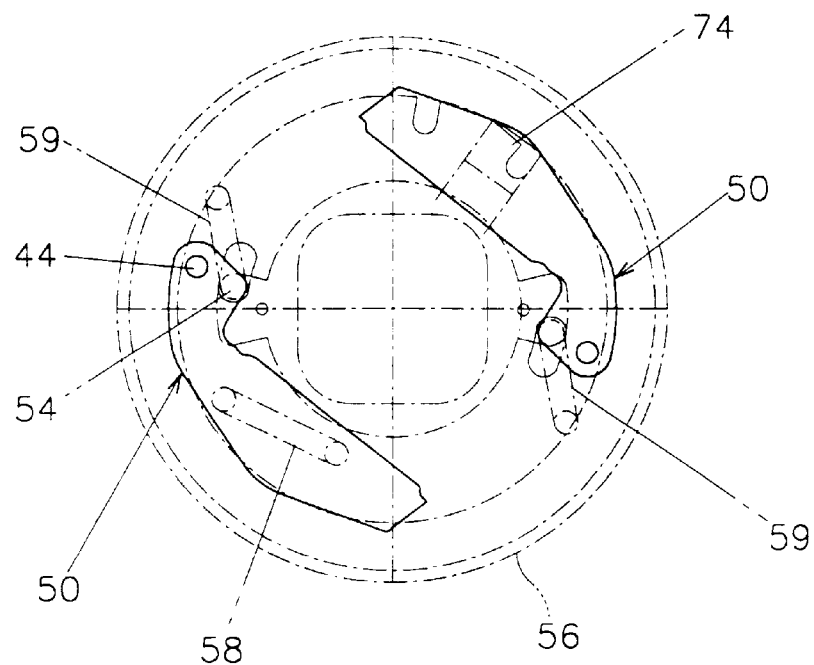
FIG. 6 is a plane view of the barrier opening and closing device shown in FIG. 1 in a state where barrier sectors are open.

Resulting from the above, elastic force of the open spring 58 and the close springs 59, in addition to the rotational force of the connection lever 74, operate the barrier driving lever 30. Since the elastic force of the close springs 59 and the rotational force of the connection lever 74 are larger than the elastic force of the open spring 58, the barrier driving lever 30 rotates counterclockwise as shown in FIG. 5 such that the ring portion 32 also rotates. This causes the prominent portions 36 of the ring portion 32 to push the sector pins 54 so that the barrier sectors 50 are rotated in a counterclockwise direction (in FIG. 5) centering on the rotation pins 44 of the barrier base 40, thereby closing the barrier sectors 50 as shown in FIG. 5. At this time, the zoom motor 6 is operated to move the movable lens barrel 2 to an initial, retracted position.

Preferred methods for opening and closing the barrier opening and closing device structured and operating as in the above will be described in detail hereinafter.

In a barrier opening and closing method according to a first preferred embodiment of the present invention, the barrier sectors 50 are open in a state where the power switch SO is turned ON. In the method, if no pictures are taken after a first predetermined time period (e.g., 1 minute), the barrier sectors 50 are automatically closed to protect the camera lens. Also, if a second predetermined time period (e.g., 3 minutes) again elapses without the user controlling the camera to take pictures after the barrier sectors 50 have been automatically closed, the movable lens barrel 2 is returned to its retracted state.

Figure 8:
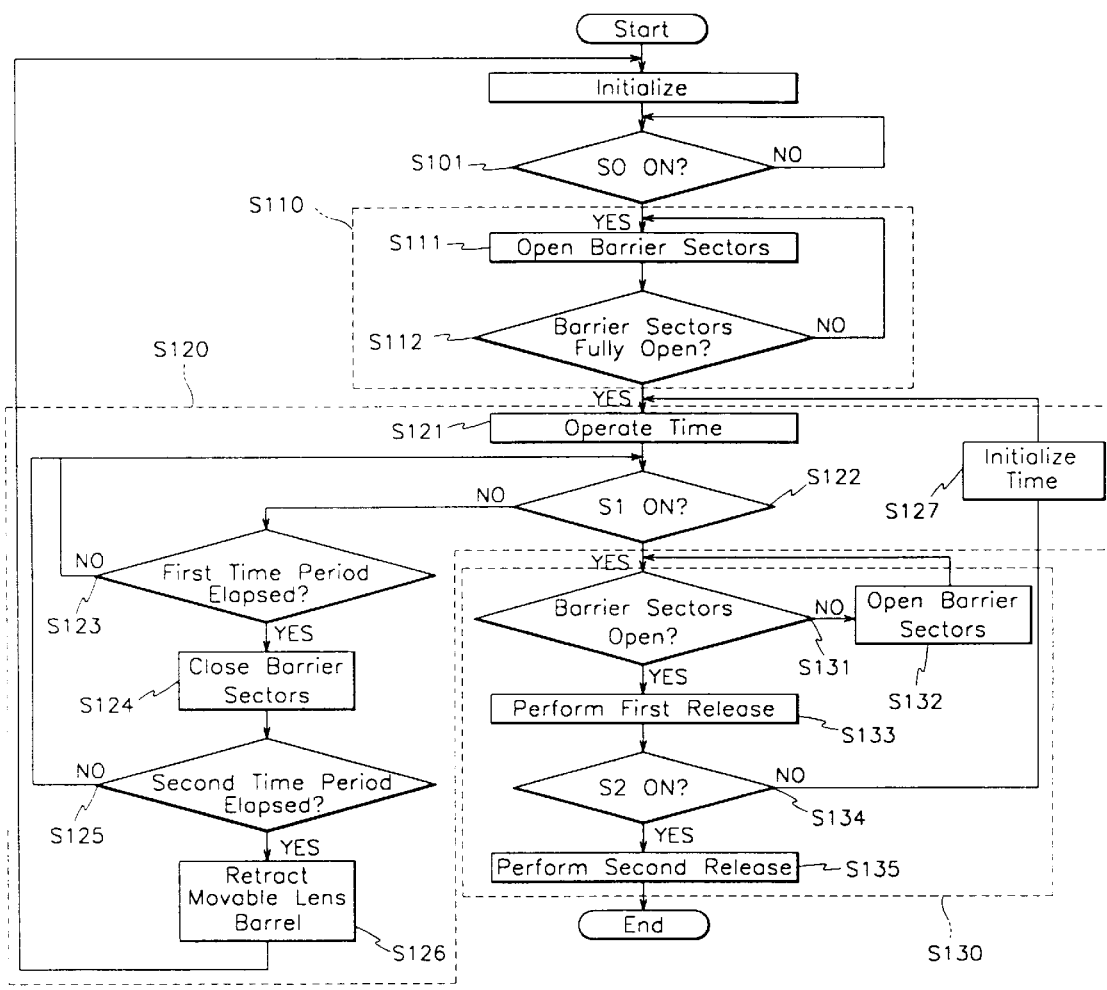
FIG. 8 is a flow chart of a barrier opening and closing method according to a first preferred embodiment of the present invention.

FIG. 8 shows a flow chart of a barrier opening and closing method according to a first preferred embodiment of the present invention. In step S101, in a state where all values have been initialized, it is determined if the power switch has been turned ON by detecting an ON signal of the power switch SO. Next, in step S110, the barrier sectors 50 are opened by operation of the barrier driving unit 96, the barrier driving unit 96 being driven by operating signals of the control unit 90. In a state where the barrier sectors 50 have been opened in step S110, if it is determined that the first release switch S1 has not been turned ON during a predetermined interval of time (e.g., 1 or 3 minutes), the barrier sectors 50 are closed or the movable lens barrel 2 is retracted in step S120. Finally, in step S130, photographing is performed according to operational signals of the first release switch S1 and the second release switch S2.

Figure 11:
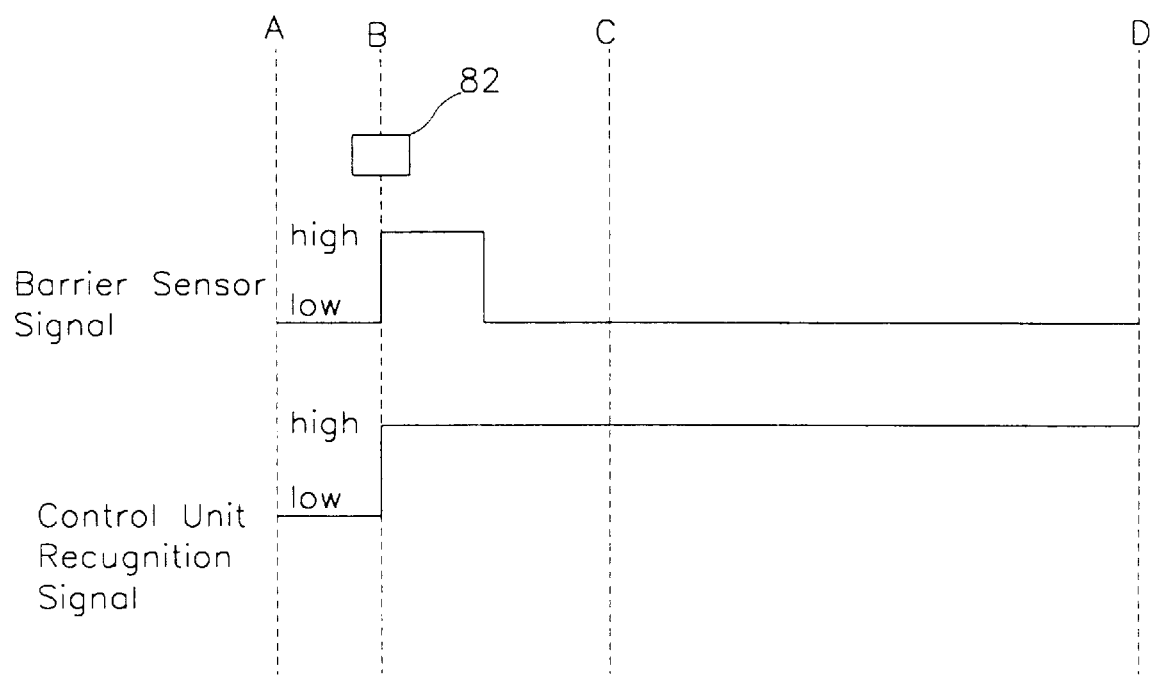
FIG. 11 is a graph of signals of a barrier sensor and signals of the control unit shown in FIG. 7.
Figure 12:
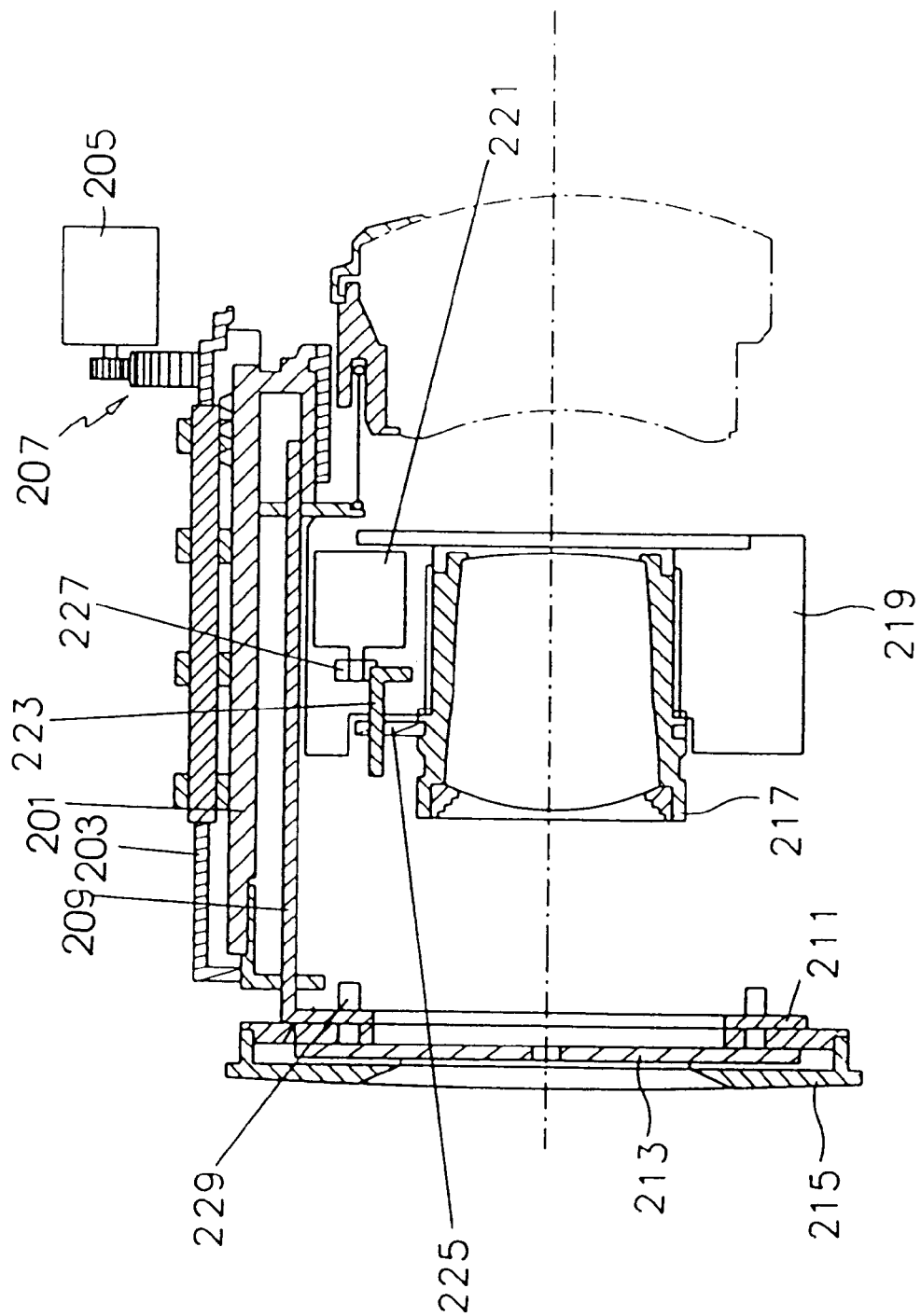
FIG. 12 is a partial cross-sectional view of a lens system in the conventional zoom camera.

Step S110 above includes the steps of opening the barrier sectors 50 by operation of the barrier driving unit 96 if it is determined in step S101 that the power switch SO has been turned to ON in step S111, and determining if the barrier sectors 50 were completely opened in step S111 using pulse signals of the barrier sensor 82 in step S112. In step S112, as shown in FIG. 11, if it is determined that the pulse signals of the barrier sensor 82 are high, the control unit 90 of the camera control system determines that the barrier sectors 50 are in an open state. However, if it is determined that the pulse signals of the barrier sensor 82 are low, control is returned to step S111 of opening the barrier sectors 50 before continuing on to step S120.

Step S120 above includes the steps of operating a timer in step S121 if it is determined that the barrier sectors 50 are open in step S112; detecting an ON signal of the first release switch S1 in step S122; determining, in step S123, if the first predetermined time period (e.g., 1 minute) has elapsed if no ON signal of the first release switch S1 is detected in step S122 and returning to step S122 if the first predetermined time period has not elapsed; closing the barrier sectors 50 by operating the barrier driving unit 96 in step S124 if no ON signal of the first release switch S1 is detected during the first predetermined time period in step S123; determining, in step S125, if the second predetermined time period (e.g., 3 minutes) has elapsed after the barrier sectors 50 are closed if no ON signal of the first release switch S1 is detected in step S122 and returning to step S122 if the second predetermined time period has not elapsed; and, in step S126, retracting the movable lens barrel 2 and initializing all the values if it is determined in step S125 that the second predetermined time period has elapsed, and returning to step S122 after the movable lens barrel 2 has been retracted.

Step S130 includes the steps of determining, in step S131, if the barrier sectors 50 are open according to the signals of the barrier sensor 82 if the ON signal of the first release switch S1 is detected in step S122; opening the barrier sectors 50 by driving the barrier driving unit 96 in step S132 if it is determined that the barrier sectors 50 are closed in step S131; performing a first release operation of measuring the distance to the object and light in step S133 if it is determined that the barrier sectors 50 are open in step S131, detecting an ON signal of the second release switch S2 in step S134; and performing a second release operation of exposure and winding film, etc. in step S135 if it is determined that the second release switch S2 has been turned ON by detecting an ON signal of the second release switch S2.

In step S134 above, if it is determined that the second release switch S2 has been turned ON, step S135 is performed as described above. However, if no ON signal of the second release switch S2 is detected, step S127 is performed in which the timer is initialized, after which the process is returned to step S121.

In the barrier opening and closing method for zoom cameras according to the first preferred embodiment of the present invention described above, by the use of the first and second predetermined time periods measured by the timer in which the barrier sectors 50 are closed and the movable lens barrel 2 retracted, respectively, if the first release switch S1 is not operated by the user, damage to the camera lens can be prevented.

In a method of opening and closing a barrier according to a second preferred embodiment, described is a method of opening the barrier sectors 50 from a state where the power switch SO is ON and the barrier sectors 50 are closed. In this method, after the barrier sectors 50 are opened and after pictures are taken, the barrier sectors 50 are again closed.

Figure 9:
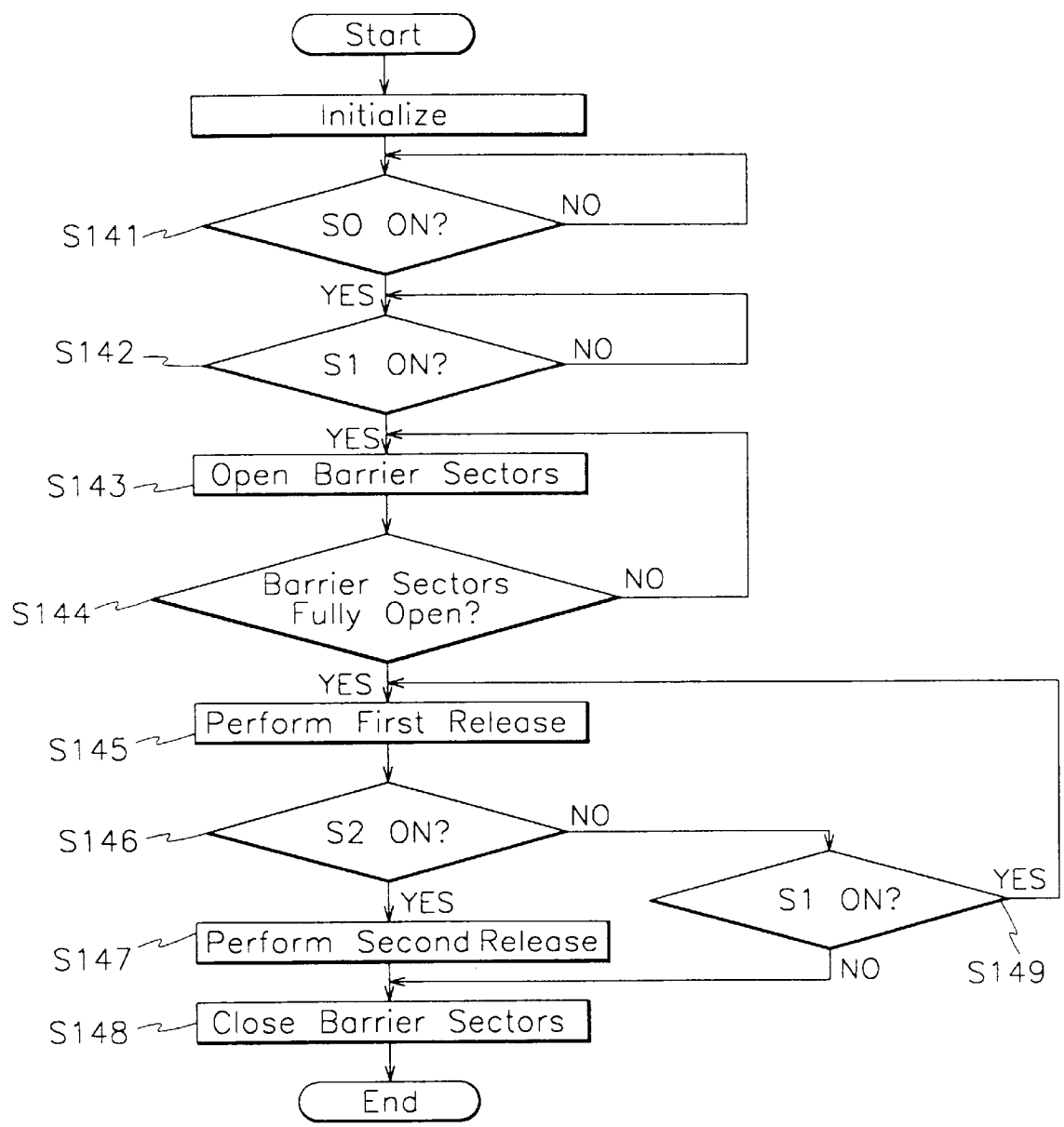
FIG. 9 is a flow chart of a barrier opening and closing method according to a second preferred embodiment of the present invention.

FIG. 9 shows a flow chart of a barrier opening and closing method according to a second preferred embodiment of the present invention. First, in a state where all values have been initialized, it is determined if the power switch has been turned ON by detecting an ON signal of the power switch SO in step S141. If it is determined that the power switch SO is ON in step S141, it is then determined if the first release switch S1 has been turned ON by detecting an ON signal of the first release switch S1 in step S142. Next, if it is determined that the first release switch S1 is ON, the barrier driving unit 96 is operated by control signals of the control unit 90 to open the barrier sectors 50 in step S143.

After the opening of the barrier sectors 50, in step S144, it is determined if the barrier sectors 50 are open according to the signals of the barrier sensor 82, and if it is determined that the barrier sectors 50 are not fully open, performing step S143 again. Next, a first release operation of measuring the distance to the object and light is performed in step S145 if it is determined that the barrier sectors 50 are open in step S144. After this step, it is determined if the second release switch S2 is ON by detecting an ON signal of the second release switch S2 in step S146.

If it is determined in the above that the second release switch S2 has been turned ON, a second release operation of exposure and winding film, etc. is performed in step S147. After the second release operation is completed, the barrier sectors 50 are closed by operating the barrier driving unit 96 using control signals of the control unit 90 in step S148. However, in step S146, if it is determined that the second release switch S2 has not been turned ON, it is then again determined if the first release switch SI has been turned ON by detecting an ON signal of the first release switch S1 in step S149. In step S149, if it is determined that the first release switch S1 has been turned ON, the process is redirected to step S145, while if it determined that the first release switch S1 has not been turned ON, the process is directed to step S148.

In the barrier opening and closing method according to the second preferred embodiment of the present invention described above, the barrier sectors 50 are maintained in a closed state even if the power switch SO is turned ON, and an ON signal of the first release switch S1 must be detected for the barrier sectors 50 to be opened. As a result, the camera lens is fully protected until the time the user intends to begin photographing.

Figure 10:
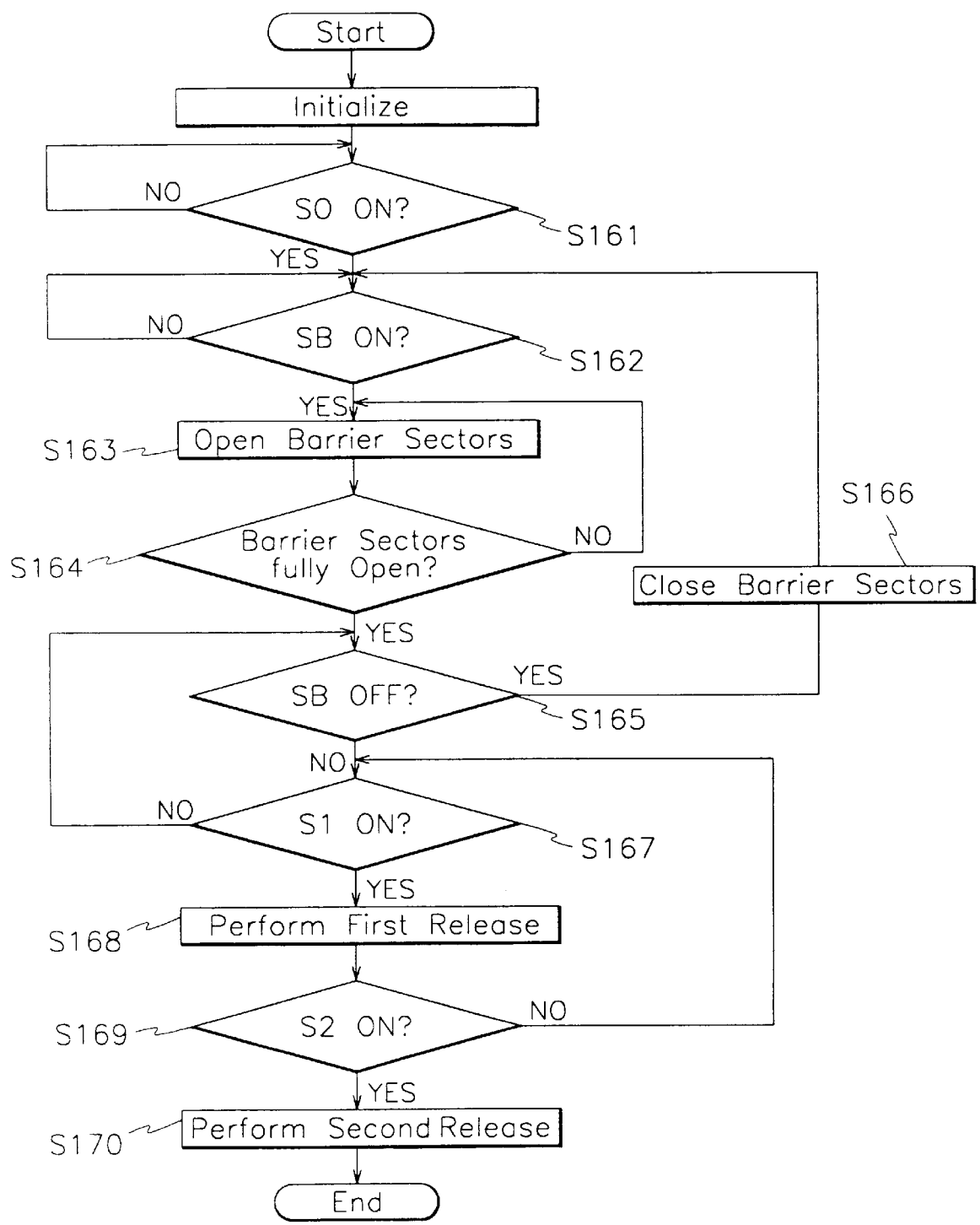
FIG. 10 is a flow chart of a barrier opening and closing method according to a third preferred embodiment of the present invention.

FIG. 10 shows a flow chart of a barrier opening and closing method according to a third preferred embodiment of the present invention. In the third preferred embodiment, the barrier switch SB is utilized. That is, the barrier switch SB (see FIG. 7) is connected to the control unit 90 such that, in a state where the power switch SO is ON, it is possible for the control unit 90 to selectively open and close the barrier sectors 50 by operating the barrier switch SB to ON and OFF states.

With reference to FIG. 10, in the method according to the third embodiment, in a state where all values have been initialized, it is determined if the power switch has been turned ON by detecting an ON signal of the power switch SO in step S161. If it is determined that the power switch SO is ON in step S161, it is then determined if the barrier switch SB has been turned ON by detecting an ON signal of the barrier switch SB in step S162. Next, if it is determined that the barrier switch SB is ON, the barrier driving unit 96 is operated by control signals of the control unit 90 to open the barrier sectors 50 in step SI163.

After the opening of the barrier sectors 50, it is determined, in step S164, if the barrier sectors 50 are fully open according to the signals of the barrier sensor 82, and if it is determined that the barrier sectors 50 are not fully open, step S163 is performed again. However, if it is determined in step S164 that the barrier sectors 50 are fully open, it is determined if the barrier switch SB has been turned OFF by detecting an OFF signal of the barrier switch SB in step S165. Here, if it is determined that the barrier switch SB has been turned to OFF, the barrier sectors 50 are closed in step S166 by operating the barrier driving unit 96 using control signals of the control unit 90, after which the process is redirected to step S162 of determining if the barrier switch SB has been turned ON.

In step S165, if it is determined that the barrier switch SB has not been turned OFF, it is then determined if the first release switch SI has been turned ON in step S167. If it is determined that the first release switch SI has not been turned ON, step S165 is repeated, while if it is determined that the first release switch S1 has been turned ON, a first release operation of measuring the distance to the object and light is performed in step S168. After this step, it is determined if the second release switch S2 is ON by detecting an ON signal of the second release switch S2 in step S169. If it is determined that the second release switch S2 has been turned ON, a second release operation of exposure and winding films etc. is performed in step S170. However, if it is determined that the second release switch has not been turned ON in step S2, the process is redirected to step S167 of determining if the first release switch S1 has been turned ON.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. In a zoom camera having a control unit, a focusing motor, a focus lens group with a lens housing, and barriers having sectors with sector pins extending therefrom, a device for opening and closing the barrier, comprising:

a connection lever fixed to the lens housing of the focus lens group and rotated by transmission of a rotational power from the focusing motor; and a barrier driving unit including a barrier driving lever contacting the connection lever to receive rotational force from the connection lever, and a ring portion for pushing the sector pins of the barrier sectors in a direction to close the barrier sectors.

2. The device of claim 1, further comprising an open spring connected to the ring portion for exerting an elastic force on the ring portion of the barrier driving unit in a direction to open the barrier sectors; and a close spring connected to the ring portion for exerting an elastic force on the ring portion of the barrier driving unit in a direction to close the barrier sectors.

3. The device of claim 2, wherein the elastic force of the open spring is greater than the elastic force of the close spring, and the elastic force of the close spring is sufficient to move the barrier sectors to close the barrier sectors.

4. The device of claim 2, wherein the rotational power of the focusing motor is greater than the elastic force of the open spring and rotates the connection lever such that the connection lever rotates the barrier driving lever and the ring portion of the barrier driving unit in a direction to close the barrier sectors.

5. The device of claim 1, further comprising a barrier sensor mounted in the zoom camera and positioned to detect a position of the barrier sectors, the barrier sensor transmitting signals corresponding to the position of the barrier sectors to the control unit of the zoom camera such that the control unit can control operation of the focusing motor.

6. The device of claim 1, further comprising a barrier switch electrically connected to the control unit of the zoom camera, the barrier switch transmitting signals to the control unit to open or close the barrier sectors.

* * * * *